July 13, 1965 L. W. JENKINS 3,193,940
STRAIN GAUGE PROFILOMETER
Filed Nov. 7, 1962
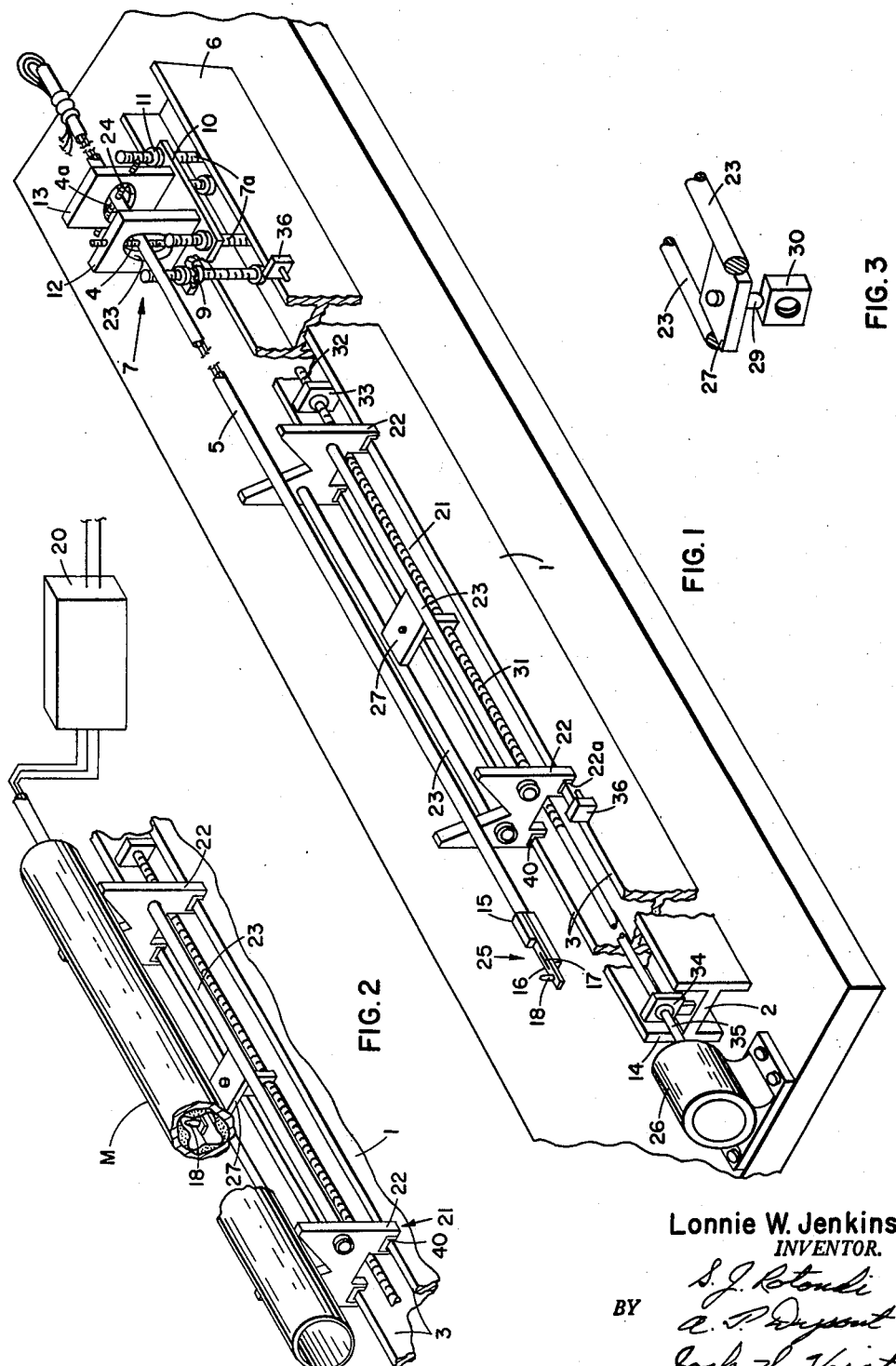
Lonnie W. Jenkins,
INVENTOR.

United States Patent Office 3,193,940
Patented July 13, 1965

3,193,940
STRAIN GAUGE PROFILOMETER
Lonnie W. Jenkins, Huntsville, Ala., assignor, by mesne assignments, to the United States of America as represented by the Secretary of the Army
Filed Nov. 7, 1962, Ser. No. 236,174
10 Claims. (Cl. 33—174)

This invention relates to an apparatus for determining the integrity of a solid propellant motor and more particularly to an electro-mechanical device for non-destructive testing of case-bonded solid propellant motors.

A case-bonded solid propellant motor generally consists of a circular metal case closed at the head end. A mixture of a polymerizable monomer and solid oxidizer is poured into the case; the monomer is polymerized, forming a single grain and is bonded to the metal case. A mandrel, inserted at the center of the motor prior to the polymerization, forms a perforation along the longitudinal axis of the motor. This perforation may be circular, star shaped, or any of other desired configurations; however, when the mandrel is removed, a perforation of the same configuration as the removed mandrel is left in the solid propellant and thereby forms the burning surface of the propellant when the propellant is ignited.

Several defects are possible in case-bonded propellant grains. Some such defects are: longitudinal cracks, extending from the perforation toward the motor wall; transverse cracks, also extending from the perforation toward the wall; delamination in which the propellant separates from the motor wall; and the presence of inhomogeneities within the propellant which do not extend to the surface.

The above mentioned defects result in an increase in the surface area or "burning area" and, upon ignition of the propellant or shortly thereafter, a corresponding increase of pressure within the motor housing which could result in explosion of the motor.

Various methods have been utilized in an attempt to reveal the above mentioned defects. Radiographs have met with little success since the difference in opacity of cavities and propellant is very small. Various ultrasonic methods have been used but again without notable success since cavities and propellants have similar wave transmission characteristics.

One successful solution to the problem of revealing structural flaws in solid propellant grain seems to lie in the actual tracing of the profile of the perforation of a propellant grain.

The soundness of this solution to test a propellant grain becomes apparent when one recognizes that case-bonded solid propellants shrink away from the mandrel during polymerization of the monomer and, since the propellant is constrained by the case-bond at the motor wall, strains are set up which may be relieved by cracking or deformation of the grain.

For each propellant composition, motor diameter, motor length, grain temperature, and perforation configuration, there will be a characteristic perforation profile and such perforation profile can be determined experimentally. This characteristic perforation profile can then be used in comparison with the profile of the motor being tested.

Any flaws within the propellant grain will be manifested by an irregularity in the perforation profile, and foreign objects present in the propellant will cause a variation from the normal shrinkage of the grain which may be detected by a physical measurement of the profile of the perforation.

It is therefore, an object of this invention to provide a profilometer to detect flaws in solid propellant grains of rocket motors.

A further object of the present invention is to provide a profilometer for non-destructive testing of solid propellant motors.

Other objects of the present invention will become apparent from the following description of the accompanying drawings of which:

FIGURE 1 is a perspective assembly drawing of the strain gage profilometer;

FIGURE 2 is a partly cut away perspective view of the cart supporting a solid propellant motor thereon and the strain gage assembly within the rocket body; and FIGURE 3 is a cut away view showing the connecting means between the cart and driving rod.

The present invention utilizes strain gages which translate mechanical movement into electrical potential so as to measure deviations in the profile of a perforation in a solid propellant motor for detection of any flaws therein. The strain gage is mounted on a cantilever beam which is in turn mounted on a frame. The solid propellant motor is mounted on a mechanically actuated cart and the cart is slideably mounted on the frame so that the beam and strain gage at the distal end of the beam are positioned within the motor perforation.

The cart carrying the solid propellant motor is moved slideably along the beam at constant velocity. The tension in the strain gage feeler holds the strain gage in contact against the surface of the propellant for slideable movement therealong as the cart and propellant move with respect to the stationary beam and strain gage. As the strain gage contact is passed over the propellant grain surface the strain gage contact rides over any irregularities. The strain gage converts this movement, normal to the cart movement, into an electric signal. This signal is fed back to a recorder where it is recorded on a strip chart as a trace of the grain profile.

The profilometer assembly of the present invention includes an I beam 1 which is mounted on any suitable framework or table such that center web 2 of beam 1 is substantially horizontal to the table and the flanges 3 of the beam are disposed in substantially normal relation to the table. A hollow tube 5 is positioned above and parallel to beam 1 and is mounted on the beam adjacent one end 6 thereof, by means of a mounting assembly 7. The mounting assembly comprises four bolts 7a secured to web 2 in a rectangular pattern and extending through and upward from the web. A flat plate 10, rectangular in shape is adjustably mounted on bolts 7a by means of a plurality of adjusting nuts 9 and 11 threadably engaging bolts 7a and disposed adjacent the lower and upper surfaces, respectively, of plate 10. To adjustably secure rod 5 to beam 1 there is provided a pair of rectangular plates 12 and 13 attached normal to and intermediate the ends of plate 10. Plates 12 and 13 extend upward and away from plate 10 in a position normal to the axis of beam 1. Plates 12 and 13 are spaced apart from each other, as shown in FIGURE 1, and have elongate holes 23 and 24 through their centers to receive tube 5 therein. Tube 5 extends through the elongate holes parallel to the longitudinal axis of beam 1. The longitudinal axis of elongate hole 23 in plate 12 is vertically disposed and tube 5 is held rigidly therein by set screws 4 threadably engaging plate 12 and disposed along the longitudinal axis of elongate hole 23. The two set screws 4 respectively extend upward from the bottom of plate 12 and downward from the top of plate 12 as shown in FIGURE 1 thereby forming a rigid support for tube 5 when threadably adjusted to firmly engage tube 5. Elongate hole 24 in plate 13 is similarly constructed except that hole 24 and set screws 4a are disposed horizontally. Plate 13 thereby forms a second support for tube 5. Adjustable movement of end 15 of tube 5 may be made in the vertical and horizontal planes by appropriately adjusting set screws 4 or screws 4a, or all four of the set screws simultaneously.

Tube 5 is further adjustable in a vertical position by equal rotation of nuts 9 and 11 thereby changing the vertical position of plate 10 and tube 5. This arrangement provides a firm support for tube 5 which can be vertically adjusted to extend into the centers of various diameters and configurations or rocket motors slideably mounted adjacent end 14 of beam 1.

A strain gage assembly 25 is mounted at the distal end 15 of tube 5. Strain gage assembly comprises a thin flexible metal plate 16, a strain gage 17 fixed thereon, and a contact point 18 affixed at the distal tip of metal plate 16, as shown in FIGURE 1. Metal plate 16 is secured to end 15 of tube 5 by any suitable means. Gage 17 is connected by wires extending through the hollow center of the tube 5 to receiving and recording equipment 20.

As shown in FIGURE 2, the solid propellant motor M being tested is carried by a cart 21 which is slideably mounted on beam 1 and actuated by an electric motor 26 (FIGURE 1) as described hereinbelow. Cart 21 comprises a pair of rectangular, flat members 22 vertically disposed on beam 1 in parallel relation with each other. The upper portion of each of the members 22 is notched to accommodate the rocket body to be tested. Members 22 are held rigidly apart by a pair of spacing rods 23 disposed parallel to beam 1 and attached normal to members 22, as shown in FIGURE 2. Members 22 are provided with lower portions which are notched as indicated at 22a to slideably fit the upper edges of the flanges 3 of beam 1. A thin flat plate 27 is rigidly affixed parallel to and extending between rods 23 (as shown in FIGURE 3). A member 29 such as a screw is affixed normal to plate 27. The head of screw 29 is rigidly affixed to one flat lobe of a nut 30 such that the longitudinal axis of screw 29 is normal to and intersects the longitudinal axis of the nut 30. Nut 30 is threadably connected intermediate the ends of a driving rod 31. Driving rod 31 is secured to motor 26 and is mounted parallel to beam 1, adjacent web 2, and is disposed for rotation to provide linear motion of the hex nut 30 along the axis of rod 31. End 32 of driving rod 31 is rotatably carried in a mounting 33 which is affixed intermediate the ends of beam 1. A second mounting 34 is provided adjacent end 14 of beam 1 to rotatably carry an end 35 of rod 31 therein. End 35 of rod 31 extends beyond mounting 34 and is affixed by suitable gear linkage means (not shown) to reversible electric motor 26.

Motor 26 provides uniform rotation of driving rod 31 causing a linear motion of non-rotating nut 30 along the longitudinal axis of rod 31. Since nut 30 is affixed to cart 21, rotation of rod 31 imparts a linear motion to the cart along beam 1. Limit switches 36 are affixed to flanges 3 and are adjustable thereon to accommodate propellant bodies of different lengths. The switches are adjusted so that cart 21 will strike and actuate switches 36 at the desired limit of travel of cart 21 corresponding to the length of the propellant body being tested. Limit switches 36 are electrically connected to the motor 26 and upon actuation serve to reverse the motor 26 and thereby reverse the direction of movement of cart 21 such that another trace of the propellant profile is made in the opposite direction.

The perforated rocket propellant body mounted on cart 21 is thereby exposed in two directions over its entire length to the profilometer assembly. After traversing one profile of the propellant body the propellant body may be rotated within cart 21 to examine other areas of the propellant body's internal structure.

"Teflon" strips 40 are mounted within notches 22a on cart 21 and ride on the upper edges of flanges 3 to permit ease of movement of cart 21 therealong by providing a bearing surface between the parts. In addition the strips serve to electrically isolate metal cart 21 and beam 1 from each other to eliminate the possibility of a static electrical discharge igniting the propellant during the movement of cart 21 along beam 1.

While the foregoing is a description of the preferred embodiment, the following claims are intended to include those modifications and variations that are within the spirit and scope of the invention.

I claim:

1. A profilometer for tracing the profile of a longitudinally perforated solid propellant motor comprising an elongate beam disposed parallel to the longitudinal axis of said perforation, a cart slideably mounted on said beam for movement therealong, means carried by said cart for attachment of said propellant motor thereto, means for slideably moving said cart along said beam, a cantilever tube, means adjustably connected to said beam for movement normal thereto, means adjustably mounting said cantilever tube adjacent one of its ends relative to said adjustably connected means for adjusting said cantilever tube to a position parallel to the longitudinal axis of said beam, said tube extending from said one end toward and into said motor perforation, a flexible contact means affixed to the distal end of said tube, and means fixed to said contact means for generating a signal which corresponds in amplitude to the movement of said contact means.

2. A profilometer as set forth in claim 1 wherein said flexible contact means comprises a thin flexible plate fixed to the distal end of said tube, a contact point fixed to the distal end of said flexible plate for engagement with the propellant body, said contact point tracing the surface of said propellant body, and a strain gage fixed to said flexible plate for indicating deflections of the plate.

3. A profilometer for tracing the profile of a longitudinally perforated solid propellant motor comprising an elongated beam disposed parallel to the longitudinal axis of said perforation, a cart slidably mounted on said beam for movement therealong, means carried by said cart for attachment of said propellant motor thereto, means for slidably moving said cart along said beam, a cantilever tube adjustably mounted adjacent one of its ends in parallel relation to said beam, said tube extending toward and into said motor perforation, a flexible contact means affixed to the distal end of said tube, means fixed to said contact means for generating a signal which corresponds in amplitude to the movement of said contact means, and said adjustable mounting of said tube comprising a pair of vertically disposed members having respectively vertically and horizontally disposed elongate holes therethrough to accommodate said tube, and set screws mounted along the longitudinal axis of each of said elongate holes and contacting said tube to adjustably position said tube with respect to said members.

4. A profilometer as set forth in claim 3 wherein said vertically disposed members are affixed to a horizontal plate adjustably mounted on a plurality of vertical threaded members by a plurality of nuts above and below said plate.

5. A profilometer as in claim 1 wherein said means for slideably moving said cart along said beam comprises a threaded nut rigidly attached to said cart and threadably engaging a rotatable shaft, reversible driving means rotating said rotatable shaft and thereby imparting linear movement to said cart.

6. A profilometer as set forth in claim 1 wherein "Teflon" strips are interposed between said beam and cart to insulate said beam from said cart.

7. A profilometer comprising; an elongate beam, a cart slidably mounted on said beam for movement therealong, said cart including means for mounting a perforated work piece thereon, means connected to said cart for slidably moving said cart along said beam, a cantilever tube, means adjustably connected to said beam for movement normal thereto, means adjustably mounting said cantilever tube adjacent one of its ends relative to said adjustably connected means for adjusting said cantilever tube to a position parallel to the longitudinal axis of said beam, said tube extending toward and over said cart, a flexible contact means affixed to the other end of said tube, and electrical means fixed to said contact means for generating a signal which corresponds in amplitude to the movement of said contact means.

8. A profilometer as set forth in claim 7 wherein "Teflon" strips are mounted on said cart and interposed between said beam and said cart.

9. A profilometer comprising; an elongate beam, a cart slidably mounted on said beam for movement therealong, said cart including means for mounting a perforated work piece thereon, means connected to said cart for slidably moving said cart along said beam, a cantilever tube, means adjustably mounting said cantilever tube adjacent one of its ends relative to said beam, said tube extending toward and over said cart, a flexible contact means affixed to the other end of said tube, electrical means fixed to said contact means for generating a signal which corresponds in amplitude to the movement of said contact means, and said adjustable mounting means including a pair of vertically disposed plates having respectively vertically and horizontally disposed elongate holes therethrough to accommodate said tube, and set screws mounted along the longitudinal axis of each of said elongate holes and contacting said tube to adjustably position said tube with respect to said vertically disposed plates.

10. A profilometer as set forth in claim 9 wherein said adjustable mounting means further includes a generally horizontal plate affixed to said vertical plates, and said horizontal plate being adjustably mounted on a plurality of vertical threaded members by a plurality of nuts above and below said horizontal plate.

References Cited by the Examiner

UNITED STATES PATENTS 2,706,340  4/55  Johnston _____ 33—174 X
2,844,879  7/58  Roeger _____ 33—174

FOREIGN PATENTS 730,316  5/55  Great Britain.

ISAAC LISANN, *Primary Examiner.*